Dec. 12, 1944.            C. ADLER, JR                    2,365,038
                             SIGNAL
                      Filed Oct. 4, 1943          3 Sheets-Sheet 1
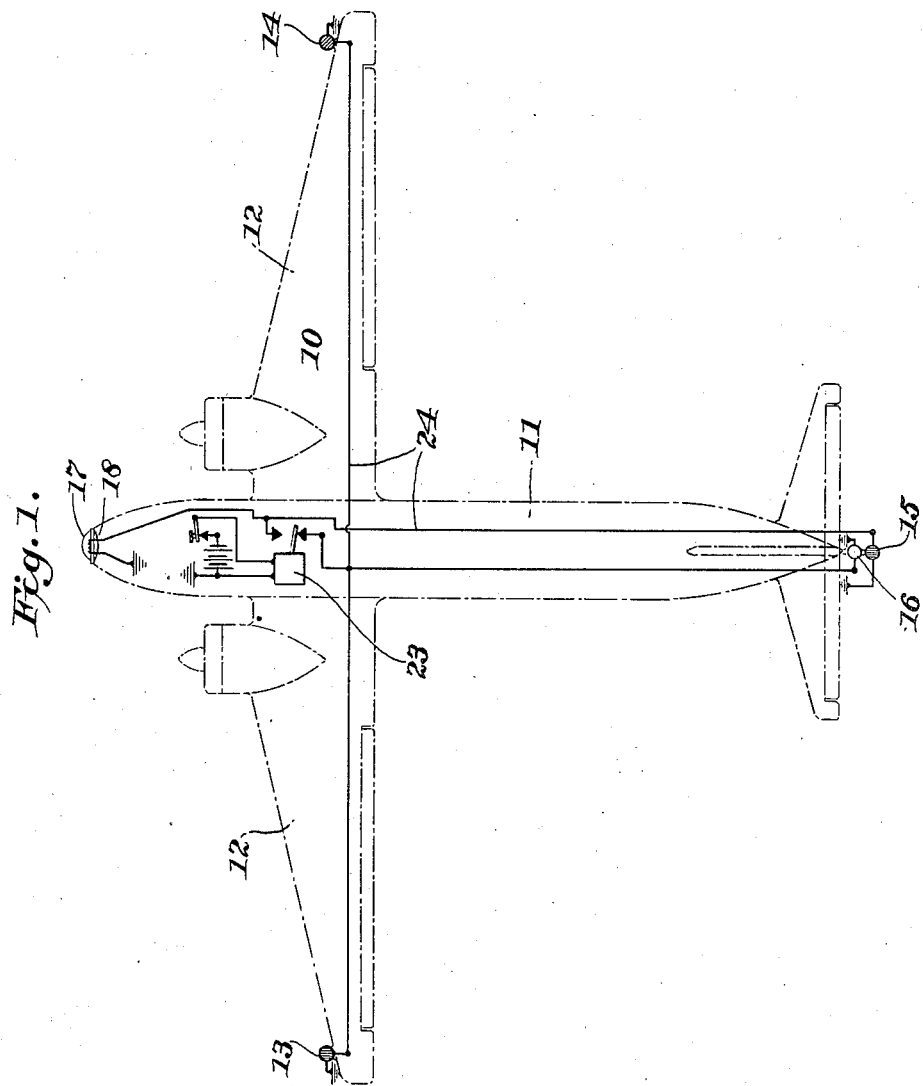
Inventor:
Charles Adler, Jr.,
By Cushman Darby & Cushman
                              Attorneys.

Dec. 12, 1944.  C. ADLER, JR  2,365,038
SIGNAL
Filed Oct. 4, 1943  3 Sheets-Sheet 2
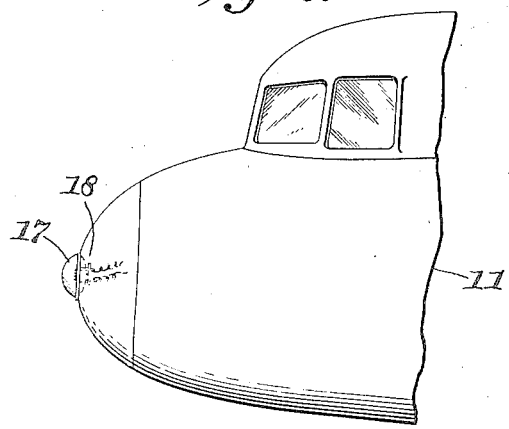
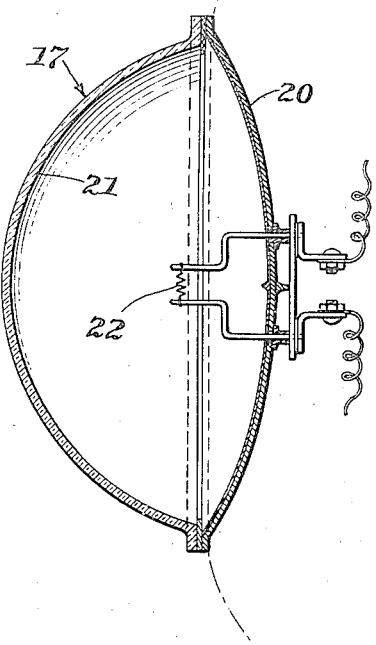
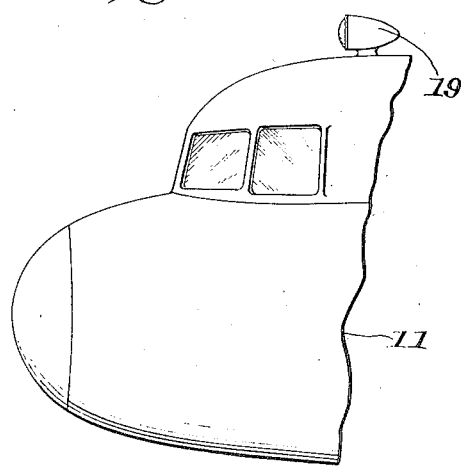
Inventor:
Charles Adler, Jr.,
By Cushman Darby & Cushman
Attorneys.

UNITED STATES PATENT OFFICE

2,365,038

SIGNAL

Charles Adler, Jr., Baltimore, Md.

Application October 4, 1943, Serial No. 504,931

1 Claim. (Cl. 177—329)

The present invention relates to an aircraft light signal for night flying wherein an arrestive flashing signal is visibly presented to approaching aircraft a substantial distance before the customary position light signals are discernible.

The primary object of the invention is to provide adequate safety means for meeting conditions created by the present and future contemplated high speeds of aircraft. The customary position lights have only a low intensity and a small luminous area, and hence do not possess sufficient range to be visible until frequently it is too late to change the course of a ship traveling at high speed.

It is a further object of the invention to provide safety means in the form of a flashing light signal which will be visible to an approaching pilot whose ship is traveling at a speed of 300 miles an hour or more, at a sufficient distance to afford ample time for safely diverting the course of the aircraft.

Another object of the invention is the provision of a signal of greater intensity than the customary position light signals, and having a larger luminous area than such signals.

An additional object of the invention is to provide a signal which will add neither substantial weight nor drag to aircraft, and which may be incorporated in present flashing position signal light systems fore and aft of the aircraft. Thus the signal system for an aircraft will consist of the customary red and green position signals which flash together, and the improved light signal of the present invention which flashes alternately with said position light signals, whereby at all times a positive signal is presented to a pilot viewing an approaching aircraft. The rear signal system will include the flashing red and white signal, wherein the white flashes with the red and green forward position light signals, and the red light flashes with the improved signal light of this invention.

Of equal importance with the foregoing, it is an object of the invention to provide a signaling system which will be visible from any position in which an approaching ship is viewed, i. e., the signaling systems are so disposed fore and aft of the ship that a positive signal is always presented.

Referring to the drawings:

Figure 1 is a diagrammatic view of my improved signaling system applied to aircraft;

Figure 2 is a side elevation, partly broken away, showing my improved high intensity signal light positioned on the nose of an aircraft;

Figure 3 is a sectional view of my improved high intensity signal light embodied in a sealed beam construction wherein the filament is so disposed as to not be at the focal point, whereby wide angle beams of light are produced as distinguished from parallel beams customary in airplane landing lights and automobile headlights;

Figure 4 is a diagrammatic view illustrating the relative ranges of visibility of the position signals and the signal light of the present invention, and further showing that a signal is presented to an approaching ship regardless of the angle at which the ship is viewed; and Figure 5 is a view similar to Figure 2 showing the improved high intensity signal light disposed in the radio antenna mounting on top of the fuselage.

In Figure 1 of the drawings, I have illustrated at 10 a conventional aircraft having fuselage 11 and wings 12. Carried by the wings at the leading edge thereof are the customary small red and green position lights 13 and 14 respectively. These lights have a diameter of about two inches to indicate the port and starboard of the ship, and suitable flashing means are provided whereby they are alternately displayed and extinguished together. The intensity of the beams from each of such position lights and their small luminous areas affords a relatively narrow range of visibility, i. e., much less than necessary to properly signal an approaching ship traveling at high speed in time to assure a safe change of course.

At the tail of the aircraft, position signals 15 and 16 are provided which are respectively red and white and alternately flashed. The red light 15 of the tail position signal is flashed when the red and green lights 13 and 14 on the leading edge of the wing and the white light 16 on the tail are extinguished.

In combination with this signaling system, I include at 17 at signal light of substantially greater size than the aforesaid front and rear position signals. This signal light has a diameter of from substantially 5 to 8 inches or more. Preferably the light is countersunk in the nose of the ship as shown at 18, but it may be located at some other convenient point where drag will not be substantially increased as for example in the radio antenna mounting 19 on top of the fuselage 11. This signal light 17 is so located and constructed as to project the light forwardly and to the sides only, i. e., through an angle of not more than 180 degrees, and not to the rear of the ship. The axis of the signal lamp 17 is preferably spect to said port and starboard signals and having greater intensity and visibility range than said red and green fore position light signals and projecting light forwardly and to the sides only of the aircraft, and a red and a different color tail light signals, means for continuously flashing said signals, said means alternately operating to illuminate said signals in groups by simultaneously illuminating at one flashing said fore red and green signals and said different color tail light signal and at an alternate flashing simultaneously illuminating said different colored fore position light signal and said red tail light signal.

CHARLES ADLER, Jr.

Patented Dec. 12, 1944

2,365,039

UNITED STATES PATENT OFFICE 2,365,039

METHOD OF TREATING OIL WELLS

Kurt H. Andresen, Bradford, Pa., assignor to Case, Pomeroy & Company, New York, N. Y., a corporation of Delaware No Drawing. Application September 9, 1941, Serial No. 410,160

3 Claims. (Cl. 166—22)

This invention relates to an improved method of selectively plugging permeable fluid-carrying strata exposed to an oil well, and more particularly the invention relates to an improved method of selectively plugging sand strata exposed to a water or gas intake well which is part of a flooding or gas repressuring system, or to a producing well producing by a fluid drive or by a combination of fluid drive and pumping.

This application is a continuation-in-part of my co-pending application Serial No. 356,736, filed September 14, 1940.

In a water flooding or gas repressuring operation to produce oil from oil-bearing sands a fluid, such as water or a gas, is forced into an input well and through the oil-bearing strata to force oil to flow through the strata to an output or producing well from which oil or a mixture of oil and the fluid is taken. In accordance with this process a series of input wells approximately equidistant from a producing well are drilled and exposed to the same oil-bearing strata. Fluid is forced down the input wells and out into the oil-bearing strata under sufficient pressure to drive the oil through the strata into the output or producing wells.

In carrying out this method of oil recovery serious difficulties have been encountered when a stratum permits flow of driving fluid to the output well without forcing oil therefrom into the output well. This condition frequently arises because oil-bearing strata having different permeabilities and so different degrees of fluid conductivity may lie closely adjacent one another and be exposed to the same input well opening. Under these circumstances the driving fluid will drive the recoverable oil from the more permeable strata before the recoverable oil is driven from adjacent less permeable strata leaving substantial quantities of recoverable oil in the less permeable strata. As more permeable strata are emptied of recoverable oil they become more permeable to the less viscous fluid of the fluid drive and act to short-circuit the driving fluid operation. Thus, it becomes necessary to pump in more and more pressure fluid for each barrel of oil produced at the output well and a condition may be reached where the cost of pumping and handling the quantity of driving fluid necessary to produce a barrel of oil is greater than the value of the oil recovered.

Also, since the rate of oil production under fluid drive is, among other factors, a function of the conductivity of the sands and the pressure drop across them, it requires a higher pressure to maintain the desired rate of production from the tighter or less permeable oil-producing sands. But if, after the more permeable strata are depleted, the pressure of the driving fluid is increased to increase the production from the tighter sands, the flow of driving fluid through the loose sand may become so great as to render the production unprofitable.

Another problem that frequently arises in water-flooding or gas repressuring operations is caused by the presence of highly permeable strata having no producible oil but lying adjacent oil-producing strata. Such "thief" sands may take large amounts of the driving fluid which is entirely lost so far as oil production is concerned. Oftentimes such loose streaks develop during the producing operations and it is difficult to determine exactly where such streaks lie with reference to the oil-producing strata.

The process of the present invention provides in general that when the ratio of driving fluid to oil produced at the output well becomes unduly high due to depletion of more permeable strata adjacent less permeable recoverable oil-bearing strata, or due to the presence of "thief" sands, the depleted more permeable strata or "thief" sands are so selectively sealed, or their conductivity is so reduced, that when injection of driving fluid is resumed a greater proportion of the driving fluid will flow through the non-depleted oil-producing strata. Further, the seal provided is such that the pressure under which the pressure fluid is injected into the wells may be appreciably increased without increasing the driving fluid to oil ratio. Thus, the rate of oil production from remaining tighter (less permeable) oil-producing sands is increased.

The problems involved in thus selectively sealing sand strata located hundreds of feet below the surface of the ground are difficult. Methods of selective sealing utilizing the relative positions of the adjacent depleted and non-depleted strata and their respective depths below the ground surface are relatively unsatisfactory where the wells are deep and possibilities of error in the depth measurements are increased. Yet the selectivity of the sealing is necessary to prevent sealing of producing strata. Also, to offset the necessity for successive treatments the dam formed by the sealing process must be permanent and able to withstand high pressures when the fluid drive is carried out at such high pressures.

Another characteristic of the well that makes selective sealing of the strata difficult is that the